(12) United States Patent
Tertel et al.

(10) Patent No.: US 9,157,032 B2
(45) Date of Patent: Oct. 13, 2015

(54) PROCESS FOR OXIDIZING ONE OR MORE THIOL COMPOUNDS

(71) Applicant: UOP, LLC, Des Plaines, IL (US)

(72) Inventors: Jonathan Andrew Tertel, Mt. Prospect, IL (US); Jasna Karagic, Chicago, IL (US); Jessy E. Trucko, Lake Forest, IL (US)

(73) Assignee: UOP LLC, Des Plaines, IL (US)

( * ) Notice: Subject to any disclaimer, the term of this patent is extended or adjusted under 35 U.S.C. 154(b) by 185 days.

(21) Appl. No.: 13/770,155

(22) Filed: Feb. 19, 2013

(65) Prior Publication Data

US 2014/0235897 A1 Aug. 21, 2014

(51) Int. Cl.
| | | |
|---|---|---|
| *C07C 319/14* | (2006.01) | |
| *C10G 19/00* | (2006.01) | |
| *B01J 4/00* | (2006.01) | |
| *B01J 8/04* | (2006.01) | |

(52) U.S. Cl.
CPC ............... *C10G 19/00* (2013.01); *B01J 4/002* (2013.01); *B01J 8/0453* (2013.01)

(58) Field of Classification Search
USPC ........................................... 568/21, 26
See application file for complete search history.

(56) References Cited

U.S. PATENT DOCUMENTS

| | | | |
|---|---|---|---|
| 2,230,654 A | 2/1941 | Plunkett | |
| 3,977,972 A | 8/1976 | Bloch et al. | |
| 4,318,825 A | 3/1982 | Frame | |
| 4,562,300 A | 12/1985 | LaFoy | |
| 4,808,765 A | 2/1989 | Pearce et al. | |
| 4,911,901 A | 3/1990 | Ogawa et al. | |
| 5,082,526 A | 1/1992 | Dorris | |
| 5,114,699 A | 5/1992 | Wiewiorowski et al. | |
| 5,207,927 A | 5/1993 | Marinangeli et al. | |
| 5,456,661 A | 10/1995 | Narciso, Jr. | |
| 5,935,548 A | 8/1999 | Franklin et al. | |
| 5,979,470 A | 11/1999 | Herich | |
| 6,086,658 A | 7/2000 | Gohara et al. | |
| 6,210,583 B1 | 4/2001 | Kurukchi et al. | |
| 6,387,348 B1 | 5/2002 | Ferrell et al. | |
| 6,808,639 B2 | 10/2004 | Rawson et al. | |
| 6,932,952 B2 | 8/2005 | Onizuka et al. | |
| 7,112,234 B2 | 9/2006 | Jha et al. | |
| 7,326,333 B2 | 2/2008 | Laricchia et al. | |
| 7,875,185 B2 | 1/2011 | Zhang | |
| 7,927,577 B2 | 4/2011 | Rameshni et al. | |
| 8,028,975 B2 | 10/2011 | Tertel et al. | |
| 8,084,013 B2 | 12/2011 | Tonjes et al. | |
| 8,097,071 B2 | 1/2012 | Burgess et al. | |
| 8,173,856 B2 * | 5/2012 | Tertel | 585/854 |
| 8,308,957 B2 | 11/2012 | Zhang et al. | |
| 2012/0000826 A1 | 1/2012 | Tertel | |
| 2012/0000827 A1 | 1/2012 | Krupa et al. | |

FOREIGN PATENT DOCUMENTS

| | | |
|---|---|---|
| EP | 0945164 A1 | 9/1999 |
| GB | 759560 | 10/1956 |
| WO | 2005121279 | 12/2005 |

OTHER PUBLICATIONS

U.S. Appl. No. 13/585,188 filed Aug. 14, 2012, Laricchia et al.
Bokotko et al, "Flue Gas Treatment for SO2 Removal with Air-Sparged Hydrocyclone Technology", Environmental Science and Technology, Feb. 2005, vol. 39, No. 4, pp. 1184-1189.
Koncsag et al., "Modelling the Removal of Mercaptans from Liquid Hydrocarbon Streams in Structured Packing Columns", Chemical Engineering and Processing, 2008, vol. 47, No. 9-10, pp. 1717-1725.
"High-Efficiency Gas/Liquid Contacting", Mott Corporation Brochure, No Later Than 2012, p. 8.
"PSS Porous Metal Filter Cartridges", Pall Corporation Brochure, 2012, p. 4 Pages.
"PSS Porous Metal Filter Cartridges—Sintered Metal Powder Filters for Liquid and Gas Service", www.Pall.com/main/products Online Catalog, No Later Than 2013, pp. 139-140.
Sun, "Packed Beds for Best Sulfur Removal", Hydrocarbon Processing, Oct. 1980, vol. 59, No. 10, pp. 99-102.
Yao, "New Achievement of Mercaptan Removal from LPG. Brief Description of a LPG Mercaptan Removal Unit", Petroleum Processing, 1991, No. 3, pp. 34-36, 66.

* cited by examiner

*Primary Examiner* — Sudhakar Katakam
*Assistant Examiner* — Pancham Bakshi
(74) *Attorney, Agent, or Firm* — James C. Paschall

(57) ABSTRACT

One exemplary embodiment can be a process for oxidizing one or more thiol compounds from an alkaline stream. The process may include passing a mixed stream having the alkaline stream to an oxidation vessel having a body and a neck. Often, the body contains one or more packing elements and the neck contains a packing, a distributor, and a mesh. The process can further include passing an oxidized alkaline stream to a separation vessel containing a first chamber and a second chamber. Usually, the first chamber contains a coated mesh.

20 Claims, 2 Drawing Sheets

PROCESS FOR OXIDIZING ONE OR MORE THIOL COMPOUNDS

FIELD OF THE INVENTION

This invention generally relates to a process for oxidizing one or more thiol compounds from an alkaline stream.

DESCRIPTION OF THE RELATED ART

A sulfur removal process can extract mercaptan from a hydrocarbon stream to a caustic stream. In a sulfur extraction unit, caustic extracts mercaptan from a hydrocarbon stream. These mercaptides may then be oxidized to disulfides by adding air and catalyst, and running the stream through an oxidizer. Often, the air is added through a tee in a line, so the air droplets are large, and unfortunately decreasing the contact area. Thus, contacting the caustic with the air may be less efficient than desired.

In a sulfur extraction unit, regenerated alkaline stream is often reused. The mercaptides in the caustic may be converted in the presence of oxygen to disulfides in an oxidizer. These three phases, spent air, lean caustic, and disulfide oil, can then be separated in a horizontal disulfide separator. Frequently, the caustic may further be contacted with a hydrocarbon to separate more disulfide oil from the caustic, requiring another vessel. Also, due to current and upcoming regulations, it is often required to contact the spent air with hydrocarbon to remove sulfur from this stream in another vessel, such as a scrubber. These vessels may require increased plot space. Moreover, the disulfide oil can be sent from the disulfide separator to a filter or water wash to remove entrained caustic prior to being sent to downstream processing. Thus, it would be desirable to reduce the number of vessels and plot space requirements for an extraction apparatus.

SUMMARY OF THE INVENTION

One exemplary embodiment can be a process for oxidizing one or more thiol compounds from an alkaline stream. The process may include passing a mixed stream having the alkaline stream to an oxidation vessel having a body and a neck. Often, the body contains one or more packing elements and the neck contains a packing, a distributor, and a mesh. The process can further include passing an oxidized alkaline stream to a separation vessel containing a first chamber and a second chamber. Usually, the first chamber contains a coated mesh.

Another exemplary embodiment may be an apparatus. The apparatus may include an oxidation vessel including a body and a neck. Often, the body contains one or more packing elements and the neck contains a packing, a distributor, and a mesh. Usually, a separation vessel contains a first chamber, containing a coated mesh, and a second chamber.

A further exemplary embodiment can be a process for oxidizing one or more thiol compounds from an alkaline stream. The process may include passing the alkaline stream through a pipe at least partially surrounded by a jacket, passing an oxygen-containing gas to the jacket, passing the mixed stream to an oxidation vessel, and passing an oxidized alkaline stream to a separation vessel to obtain a regenerated alkaline stream. The oxygen-containing gas can pass through the pipe and mix with the alkaline stream.

In one exemplary embodiment, a sintered steel fluid mixer can be used upstream or in an oxidation vessel. The sintered steel fluid mixer may be a dynamic in-line sparger to introduce air into the caustic. Hence, smaller bubbles of air can be mixed into the caustic, providing a more efficient contacting of oxygen and caustic.

In another exemplary embodiment, six vessels, such as an oxidizer, a disulfide separator, a wash oil settler, a disulfide sand filter, a vent gas scrubber, and a vent tank, can be replaced with two vertical vessels, and thus reducing plot space requirements. Also, additional stages of wash oil contacting with the caustic may occur without adding additional vessels, which can be required to meet a total sulfur specification in a product hydrocarbon stream. Moreover, a spent air can be contacted with wash oil in an oxidation vessel, decreasing sulfur in the spent air stream. Additionally, the disulfide separation vessel including a mesh can allow the disulfide oil/wash oil mixture to be sent directly out to downstream processing without the use of a disulfide sand filter.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three carbon atoms and/or more. In addition, the term "stream" may be applicable to other fluids, such as aqueous and non-aqueous solutions of alkaline or basic compounds, such as sodium hydroxide.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 50%, and preferably about 70%, by weight, of a compound or class of compounds in a stream. If referring to a solute in solution, e.g., one or more disulfide compounds in an alkaline solution, the term "rich" may be referenced to the equilibrium concentration of the solute. As an example, about 5%, by mole, of a solute in a solvent may be considered rich if the concentration of solute at equilibrium is 10%, by mole.

As used herein, the term "substantially" can mean an amount of at least generally about 80%, preferably about 90%, and optimally about 99%, by weight, of a compound or class of compounds in a stream.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a bolt, a staple, or a rivet; an adhesive; or a solder.

As used herein, the term "coalescer" may be a device containing glass fibers or other material to facilitate separation of immiscible liquids of similar density.

As used herein, the term "immiscible" can mean two or more phases that cannot be uniformly mixed or blended.

As used herein, the term "phase" may mean a liquid, a gas, or a suspension including a liquid and/or a gas, such as a foam, aerosol, or fog. A phase may include solid particles. Generally, a fluid can include one or more gas, liquid, and/or suspension phases.

As used herein, the term "alkali" can mean any substance that in solution, typically a water solution, has a pH value greater than about 7.0, and exemplary alkali can include sodium hydroxide, potassium hydroxide, or ammonia. Such an alkali in solution may be referred to as "an alkaline solution" or "an alkaline" and includes caustic, i.e., sodium hydroxide in water.

As used herein, the term "parts per million" may be abbreviated herein as "ppm" and "weight ppm" may be abbreviated herein as "wppm".

As used herein, the term "mercaptan" typically means thiol and may be used interchangeably therewith, and can include compounds of the formula RSH as well as salts thereof, such as mercaptides of the formula $RS^-M^+$ where R is a hydrocarbon group, such as an alkyl or aryl group, that is saturated or unsaturated and optionally substituted, and M is a metal, such as sodium or potassium.

As used herein, the term "disulfides" can include dimethyldisulfide, diethyldisulfide, and ethylmethyldisulfide, and possibly other species having the molecular formula RSSR' where R and R' are each, independently, a hydrocarbon group, such as an alkyl or aryl group, that is saturated or unsaturated and optionally substituted. Typically, a disulfide is generated from the oxidation of a mercaptan-containing caustic and forms a separate hydrocarbon phase that is not soluble in the aqueous caustic phase. Generally, the term "disulfides" as used herein excludes carbon disulfide ($CS_2$).

As used herein, the weight percent or ppm of sulfur, e.g., "wppm-sulfur" is the amount of sulfur, and not the amount of the sulfur-containing species unless otherwise indicated. As an example, methylmercaptan, $CH_3SH$, has a molecular weight of 48.1 with 32.06 represented by the sulfur atom, so the molecule is about 66.6%, by weight, sulfur. As a result, the actual sulfur compound concentration can be higher than the wppm-sulfur from the compound. An exception is that the disulfide content in caustic can be reported as the wppm of the disulfide compound.

As used herein, the term "lean caustic" is a caustic having been treated and having desired levels of sulfur, including one or more mercaptans and one or more disulfides for treating one or more C1—C5 hydrocarbons in an extraction zone.

As used herein, the term "regeneration" with respect to a solvent stream can mean removing one or more disulfide sulfur species from the solvent stream to allow its reuse.

As depicted, process flow lines in the figures can be referred to, interchangeably, as, e.g., lines, pipes, branches, distributors, streams, effluents, feeds, products, portions, catalysts, withdrawals, recycles, suctions, discharges, and caustics.

DETAILED DESCRIPTION

Figure 1:
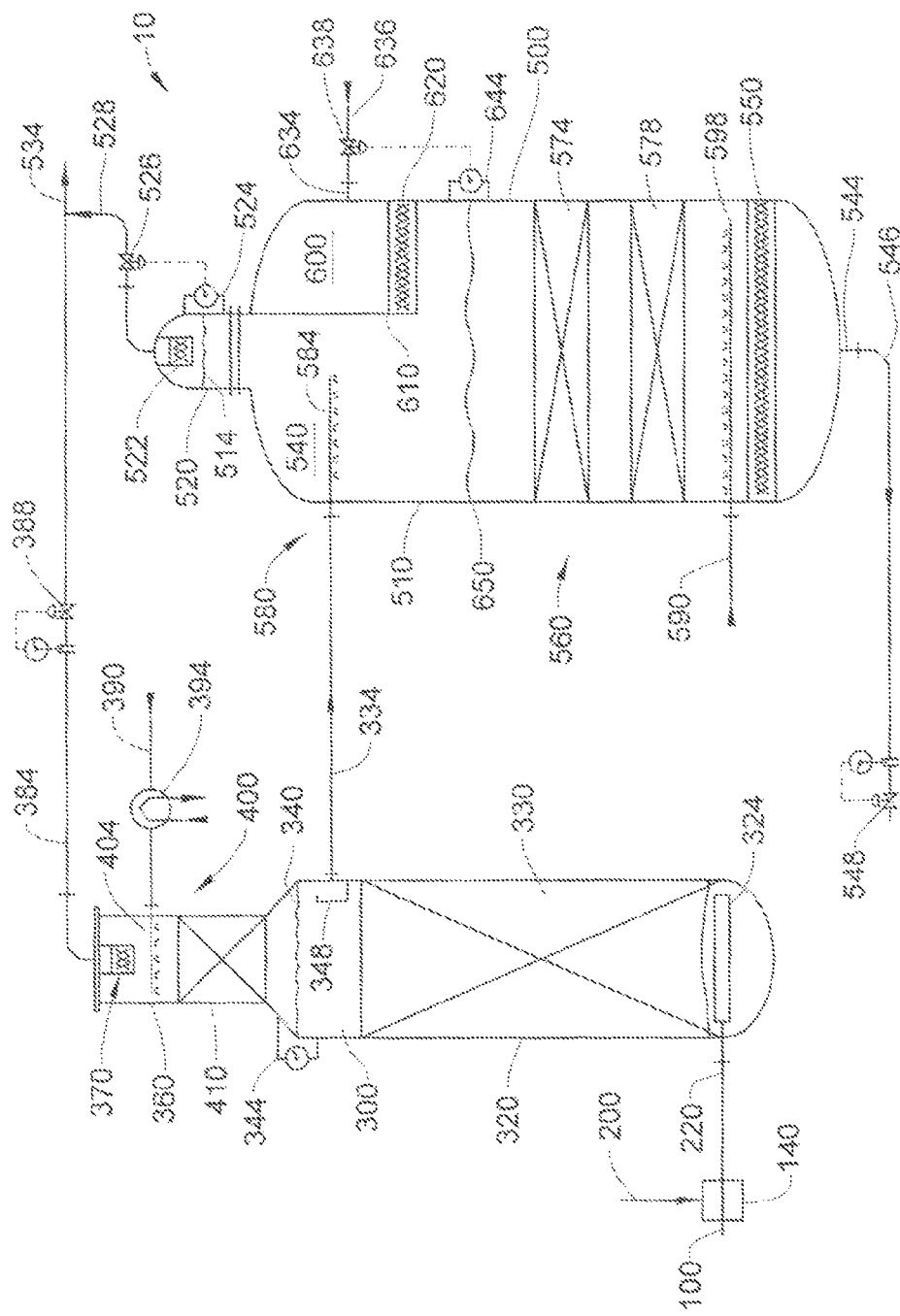
FIG. 1 is a schematic, cross-sectional depiction of an exemplary apparatus.

Referring to FIG. 1, an exemplary apparatus 10 is depicted, which may include an oxidation vessel 300 and a separation vessel 500. Typically, the apparatus 10 receives an alkaline stream 100 including one or more thiol compounds.

The alkaline stream 100 is typically a spent caustic including one or more mercaptides. The spent caustic can be obtained from an extraction zone to remove sulfur compounds from one or more hydrocarbons, such as one or more C2—C8 hydrocarbons. Such exemplary extraction zones are disclosed in, e.g., US 2012/0000826.

The alkaline stream 100 can be passed to a fluid mixer 140, as hereinafter described. Usually, the fluid mixer 140 is adapted to receive an oxygen-containing gas 200, often air. Afterwards, a mixed stream 220 containing the alkaline stream 100 and an oxygen-containing gas, such as air, may enter the oxidation vessel 300.

The oxidation vessel 300 can include a body 320 and a neck 360. Generally, the neck 360 can be coupled to the body 320 in any suitable manner, such as welds, or may be formed integrally together out of a common piece of sheet metal. The neck 360 may have a smaller diameter than the body 320. Often, the body 300 can include a distributor 324, one or more packing elements 330, a level indicator 344, and a baffle 348. Typically, the distributor 324 can be any suitable device, such as a ring distributor or an elongated pipe forming a series of holes. The one or more packing elements 330 can include any suitable packing, such as at least one of ring packing, such as one or more carbon or stainless steel rings, a fiber contactor, a film contactor, one or more trays, and a mesh, to increase the surface area for improving contact between the rich caustic, catalyst, and the oxygen-containing gas. One exemplary ring packing can include rings sold under the trade designation RASCHIG by Raschig GmbH of Ludwigshafen, Germany. Alternatively, the carbon rings or a carbon bed can be impregnated with a metal phthalocyanine catalyst, as disclosed in, e.g., U.S. Pat. No. 4,318,825 and U.S. Pat. No. 5,207,927.

The neck 360 can include a mesh 370, a distributor 400, and a packing 410. Generally, the mesh 370 can be any suitable metal and can form rings or a web to facilitate coalescence of liquid. The distributor 400 can be any suitable distributor including an elongated pipe 404 forming one or more holes and be coupled to a line passing through a cooling water exchanger 394. The packing 410 can be similar to the one or more packing elements 330 described above, and include any sort of metal mesh or web, or one or more carbon rings to facilitate contacting.

The separation vessel 500 can include a body 510 and a neck 520. The neck 520 can be coupled to the body 510 in any suitable manner, such as welding or integrally formed from a single metal sheet. The neck 520 may have a smaller diameter than the body 510. Generally, the body 510 can be subdivided into a first chamber 540 and a second chamber 600. The first chamber 540 can form an outlet 544 communicating with a flow control valve 548, and include one or more packed beds 560 and one or more distributors 580. Generally, the one or more packed beds 560 can include any number of suitable beds, and include one to four beds. In this exemplary embodiment, the one or more packed beds 560 can include a first packed bed 574 and a second packed bed 578. The first and second packed beds 574 and 578 can include any suitable packing, such as a structured packing, such as structured metal vapor packing, or a random packing obtained from, e.g., Koch-Glitsch, LP of Wichita, Kans. In addition, the first chamber 540 can include a coalescer 550, which can include one or more coalescing elements, such as at least one of a metal mesh that is optionally coated, one or more glass fibers, sand, or anthracite coal. In one exemplary embodiment, the coalescer 550 can include a coated mesh. Desirably, the coating may be an oleophilic and/or hydrophobic coating usually suited for an aqueous phase. Such a coating may include at least one of a fluoropolymer and polypropylene. Suitable fluoropolymers can include one or more of polytetrafluoroethylene, fluorinated ethylene-propylene, perfluoroalkoxy, and ethylene tetrafluoroethylene. Exemplary fluoropolymers are disclosed in U.S. Pat. Nos. 5,456,661 and 2,230,654.

The one or more distributors 580 can include a first distributor 584 and a second distributor 598. Distributors can take any suitable form, such as a ring or an elongated pipe forming one or more holes.

The second chamber 600 can include a lower end 610 and contain a coalescer 620. The coalescer 620 may include one or more coalescing elements, such as at least one of a metal mesh that is optionally coated, one or more glass fibers, sand, or anthracite coal. . In one exemplary embodiment, the coalescer 550 can include a coated mesh. Desirably, the coating may be an oleophobic and/or hydrophillic coating usually suited for an oil phase. One exemplary mesh may include a coating sold under the trade designation COALEX or KOCH-OTTOYORK™ separations technology by Koch-Glitsch, LP of Wichita, Kans. Alternatively, the mesh can include stainless steel or fiberglass. The neck 520 can include a mesh 522 and be coupled with a level controller 524.

Figure 2:
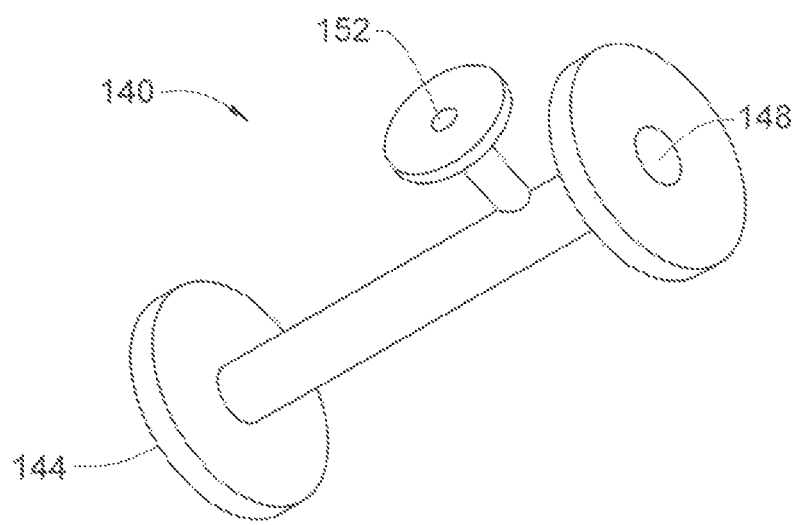
FIG. 2 is a perspective view of an exemplary fluid mixer.
Figure 3:
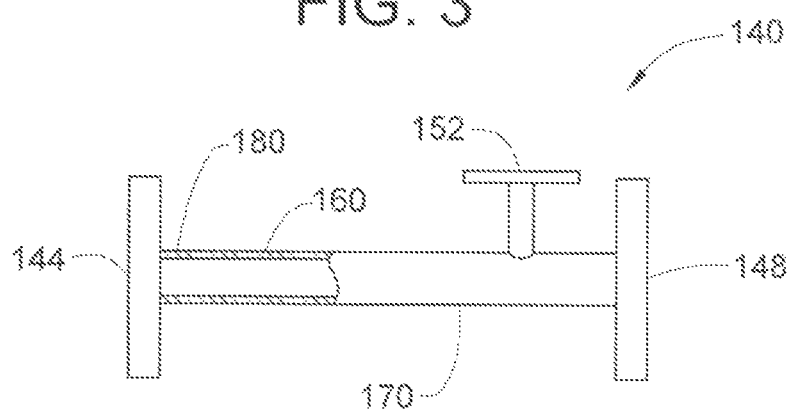
FIG. 3 is a side, elevational, and partial cut-away view of the exemplary fluid mixer.

Referring to FIGS. 2-3, an exemplary fluid mixer 140 is depicted. The fluid mixer 140 can include a liquid inlet 144, a mixed phase outlet 148, and a gas inlet 152. Generally, the fluid mixer 140 is fabricated from any suitable metal, such as carbon or stainless steel. Often, the at least a portion of the fluid mixer 140 can be fabricated from sintered metal, i.e., metal particles that are heated and fused together. In particular, the fluid mixer 140 can form an annulus 180 via a jacket 170 at least partially surrounding a pipe 160. Thus, gases, such as air, entering the gas inlet 152 can fill the annulus 180 to be contained by the jacket 170 and surround the pipe 160. This design can permit gases to permeate the pipe 160, which may often be fashioned from sintered metal, such as a carbon and/or stainless steel, to allow mixing therein. Air may pass through the sintered steel and be introduced into the caustic creating very small bubbles and increasing the amount of mass transfer area available between the two phases. Improved mixing can reduce residence time in the oxidation vessel 300 and permit easier maintenance of the fluid mixer 140. Often, the fluid mixer 140 can be any suitable device, such as a dynamic sparger manufactured by Mott Corporation of Farmington, Conn. In other exemplary embodiments, the caustic and air can be combined without a fluid mixer 140 and provided directly to the oxidation vessel 300 via a distributor made from sintered metal, an elongated pipe forming holes, or a ring-shaped distributor.

In operation, referring to FIG. 1, generally an alkaline stream 100 is passed through the fluid mixer 140. Typically, the fluid mixer 140 operates at a temperature of about 35—about 55° C., and a pressure of about 340—about 630 KPa. Often, a pressure drop of about 6—about 21 KPa occurs in the pipe that may be dependent on the rate of the alkaline stream 100 passing therethrough. Often, the oxygen-containing gas, having an oxygen content of about 5—about 30%, by mole, oxygen, can form droplets of about 200—about 600 microns in diameter as a separate phase from the caustic. The oxygen-containing gas can include air or oxygen enriched air up to about 30%, by mole, oxygen.

The mixed stream 220 can enter the oxidation vessel 300 via the distributor 324. The caustic and air may exit the distributor 324 and rise through the one or more packing elements 330 providing sufficient surface area for an oxidation reaction with contacting of the oxygen and caustic. The caustic and disulfide oil/wash oil can exit the oxidation vessel 300 by collecting in the baffle 348. Typically, the spent air disengages from the liquid and passes up through the packing 410, where the spent air counter-currently may contact a wash oil stream 390 that may be passed through a cooling water exchanger 394 and enter via the distributor 400 to remove disulfide oil from the spent air. The wash oil stream 390 may include a hydrotreated heavy naphtha, kerosene, or diesel oil with little or no sulfur. Generally, it is preferable that the wash oil stream 390 has less than about 10 ppm, preferably less than about 1 ppm, by weight, of sulfur, as disclosed in, e.g., U.S. Pat. No. 8,173,856. Gases can rise upward and pass through the packing 410 and be contacted with a wash oil stream 390. The wash oil can fall downward contacting the gas to remove any sulfur compounds therein while the gas can continue to rise upward and pass through the mesh 370. Often, the gas must travel through the mesh 370 before exiting the oxidation vessel 300. Preferably, any liquid can coalesce as droplets while the gas can exit the neck 360 of the oxidation vessel 300 after passing through the mesh 370. The spent air stream 384 may be regulated via a pressure control valve 388. The wash oil can aid the separation of disulfide compounds.

Usually, the sulfur compounds within the caustic can be converted to one or more disulfide compounds. A liquid/gas interface 340 may occur at the top of the one or more packing elements 330. Liquid can flow over the baffle 348 and exit as an oxidized caustic stream 334 containing wash oil and disulfide oil. The liquid/gas interface 340 can be measured with the level indicator 344 and optionally controlled by regulating the pressure within the body 320. The oxidized caustic stream 334 containing wash oil and disulfide oil can pass to the separation vessel 500.

Generally, the caustic stream 334 passes through the first distributor 584 in the separation vessel 500 with liquid falling and gases rising within the first chamber 540. The separation vessel 500 may operate at a temperature of no more than about 60° C., and a pressure of about 250—about 500 KPa, preferably about 350—about 450 KPa. Usually, a couple of interfaces may be formed, namely a liquid-liquid interface 650 of caustic and oil, and an air-liquid interface 514 in the neck 520. Gases can rise from the air-liquid interface and pass through the mesh 522 that can coalesce any liquids. Often the gases must travel through the mesh 522 before exiting the separation vessel 500. The level of the air-liquid interface 514 may be measured by a level controller 524 communicating with a level control valve 526. An exiting gas stream 528 can be combined with the spent air stream 384 to form a combined stream 534. Generally, the total sulfur in the combined stream 534 can be no more than about 100 ppm, by weight, but may be more than about 1 ppm sulfur, by weight. As such, the gas can be sent to a vent tank if subsequently provided to a fired heater, or to a carbon canister.

The oxidized caustic stream 334 containing two phases, namely caustic and wash and disulfide oils, can fall and pass through the packed beds 574 and 578. Simultaneously, a wash oil stream 590 can exit through the second distributor 598 and rise, thereby contacting the caustic and removing the disulfides. Additionally, the caustic can continue to further drop in the body 510 and pass through the coalescer 550 further separating the caustic from the oils. A regenerated caustic can pass via the outlet 544 as a regenerated alkaline stream 546 substantially free of disulfide oil and sulfur compounds. The regenerated alkaline stream 546 can be regulated by a flow control valve 548.

The wash and disulfide oils can rise and pass through the lower end of the second chamber 600 and then pass through the coalescer 620. In one exemplary embodiment, the mesh 620 can be at any suitable location, such as above the distributor 584 and may be a distance of at least one diameter of the separation vessel 500 above. The coalescer 620 can coalesce out any caustic that can fall downward within the body 510. Oils can rise within the second chamber 600 and exit through an outlet 634. A level control valve 638 can communicate with a level controller 644 at the liquid-liquid interface 650 to regulate the amount of the hydrocarbon or oil stream 636 substantially free of caustic, such as less than about 1 wppm of caustic, that can exit the second chamber 600 and be sent to downstream processing without requiring further filtering or washing to remove caustic.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for oxidizing one or more thiol compounds from an alkaline stream, comprising:
   A) passing a mixed stream comprising the alkaline stream to an oxidation vessel comprising a body and a neck, wherein the body contains one or more packing elements and the neck contains a packing, a distributor, and a mesh; and
   B) passing an oxidized alkaline stream to a separation vessel containing a first chamber and a second chamber wherein the first chamber contains a coated mesh.

2. The process according to claim 1, further comprising:
   passing the alkaline stream through a pipe at least partially surrounded by a jacket;
   passing an oxygen-containing gas to the jacket wherein the oxygen-containing gas passes through the pipe and mixes with the alkaline stream; and
   passing the mixed stream to the oxidation vessel.

3. The process according to claim 2, wherein the oxygen-containing gas comprises air.

4. The process according to claim 1, wherein the oxidation vessel is at a temperature of about 35-about 55° C.

5. The process according to claim 1, wherein the oxidation vessel is at a pressure of about 340-about 630 KPa.

6. The process according to claim 2, wherein a pressure drop through the pipe is dependent upon a flow rate of the alkaline stream.

7. The process according to claim 2, wherein the oxygen-containing gas forms droplets of about 200-about 600 microns as a separate phase from the alkaline stream.

8. The process according to claim 7, wherein the mesh in the neck comprises any suitable metal.

9. The process according to claim 1, wherein the separation vessel comprises a body and neck.

10. The process according to claim 1, wherein the packing comprises at least one of a ring packing, a fiber contactor, a film contactor, and one or more trays.

11. The process according to claim 10, further comprising passing a spent oxygen-containing gas through the packing and then the mesh contained in the neck of the oxidation vessel.

12. The process according to claim 1, wherein the first chamber can include one or more packing beds and one or more distributors.

13. The process according to claim 12, wherein the second chamber comprises a coated mesh.

14. A process for oxidizing one or more thiol compounds from an alkaline stream, comprising:
   A) passing the alkaline stream through a pipe at least partially surrounded by a jacket;
   B) passing an oxygen-containing gas to the jacket wherein the oxygen-containing gas passes through the pipe and mixes with the alkaline stream;
   C) passing the mixed stream to an oxidation vessel; and
   D) passing an oxidized alkaline stream to a separation vessel to obtain a regenerated alkaline stream.

15. A process for oxidizing one or more thiol compounds from an alkaline stream, comprising:
   A) passing a mixed stream comprising the alkaline stream to an oxidation vessel comprising a body and a neck, wherein the body contains one or more packing elements and the neck contains a packing, a distributor, and a mesh;
   B) forming a liquid-gas interface at the top of the one or more packing elements in the oxidation vessel; and
   C) passing an oxidized alkaline stream to a separation vessel containing a first chamber and a second chamber wherein the first chamber contains a coated mesh.

16. The process according to claim 15, wherein the oxidation vessel is at a temperature of 35-55° C.

17. The process according to claim 15, wherein the oxidation vessel is at a pressure of 340-630 KPa.

18. The process according to claim 16, wherein a pressure drop through the pipe is dependent upon a flow rate of the alkaline stream.

19. The process according to claim 15, wherein the oxygen-containing gas forms droplets of 200-600 microns as a separate phase from the alkaline stream.

20. The process according to claim 15, wherein the separation vessel comprises a body and neck.

* * * * *